United States Patent [19]
Frederiksen et al.

[11] Patent Number: 5,115,733
[45] Date of Patent: May 26, 1992

[54] NUT SHELLING MACHINE

[76] Inventors: Wilfred C. Frederiksen, 16881 Bolero La., Huntington Beach, Calif. 92649; Sun Y. Kim, 2384 Lancaster Ct., Hayward, Calif. 92649

[21] Appl. No.: 328,448

[22] Filed: Mar. 24, 1989

[51] Int. Cl.$^5$ .............................................. A23N 5/00
[52] U.S. Cl. ...................................... 99/574; 99/579; 99/580; 99/581
[58] Field of Search .................. 99/568, 574–576, 99/581–582, 609, 610, 625–628, 621; 426/482; 241/6, 7, 252; 100/158

[56] References Cited

U.S. PATENT DOCUMENTS

| | | | |
|---|---|---|---|
| 1,342,692 | 6/1920 | Pape | 99/575 |
| 1,591,251 | 7/1926 | Vaughan | 99/575 |
| 2,321,795 | 6/1943 | Buckman | 99/575 |
| 3,889,583 | 6/1975 | Mizuno et al. | 99/576 |
| 4,073,032 | 2/1978 | Packwood | 99/574 |
| 4,201,126 | 5/1980 | Evans | 99/574 |
| 4,307,660 | 12/1981 | Clavel | 99/575 |
| 4,397,228 | 8/1983 | Thornton | 99/576 |
| 4,462,309 | 6/1984 | Frazier | 99/575 |
| 4,608,007 | 8/1986 | Wood | 425/363 |
| 4,643,086 | 2/1987 | Christodoulou | 99/574 |
| 4,658,712 | 4/1987 | Spencer | 99/610 |
| 4,708,056 | 11/1987 | Dinanath | 99/575 |
| 4,819,331 | 4/1989 | Joyama | 99/579 |

Primary Examiner—Timothy F. Simone
Attorney, Agent, or Firm—Bielen, Peterson & Lampe

[57] ABSTRACT

A nut cracking machine constructed to crack nuts of different size in a continuous operation is provided, the machine having first and second disks that are spaced apart with opposed tapered faces forming a narrowing gap therebetween, the first disk being rotated on a first axis and the second disk being rotated together with the first disk on a second axis slightly skewed from the first axis such that the face of one disk is oblique to the face of the other disk and when rotated together, the gap between the faces of the disks has a wide sector and a narrow sector. The machine includes a feed mechanism to feed nuts of different size to the space between the disks where the space is widest, the nuts advancing between the tapered faces until the nuts are engaged by the disks and are then transported to where the gap narrows, the disks compressing the nuts therebetween and cracking the shells.

13 Claims, 2 Drawing Sheets

NUT SHELLING MACHINE

BACKGROUND OF THE INVENTION

This invention relates to a nut cracking machine and in particular to a machine for continuous cracking of hard shell nuts that may vary in size.

Prior art nut cracking machines have used various techniques to crack the shell of different nuts. For certain hard to shell nuts such as the macadamia nut, spaced rollers have been conventionally used to crack the thick protective shell by pressure of the rollers. The rollers are spaced a predetermined distance apart and the nuts are fed between the rollers for cracking. In order that the appropriate pressure be applied to the nut shells to properly free the meat from the shell without crushing the kernel, the nuts must be graded according to size. Similarly, in the nut shelling machine described in the patent of these inventors, entitled "Nut Shelling Machine," U.S. Pat. No. 4,793,248, issued Dec. 27, 1988, opposed blades engage and split the thick shell of the macadamia. The nuts must be pre-sized such that the blades penetrate the shell to the proper depth to effect splitting without damage to the nut.

Sorting nuts according to size is a difficult task since nuts are rarely of uniform configuration. Even nuts such as macadamia nuts, which are generally spherical in configuration, vary both in size and shape. Individual nuts may have flat sides or be oblong in shape. Conventional methods for grading nuts, using grates with progressively larger slots through which the nuts can drop, or progressively, sized screens arranged in a series may result in sorting errors because of the orientation of nonuniform nuts as they pass over the grading openings.

Nuts that are too small for a particular setting of a shelling machine may pass unshelled or be incompletely shelled. Nuts that are too large for a particular machine setting may be crushed, fragmenting the kernel. Whole nuts naturally command a premium price, and while fragments can be salvaged, a resulting loss in value occurs. Unshelled or partially shelled nuts must be reprocessed, and because of their shape or partially shelled condition, usually become fragmented on reprocessing.

A nut cracking machine that can effectively shell nuts that vary in size without presorting of the nuts according to size is therefore desirable. Additionally, a shelling machine that can effectively reprocess nuts that are partially shelled with minimum damage to the remaining kernel would be of value to existing operations.

It is an object of the nut cracking machine of this invention that pressure cracking of nuts of various size is accomplished in a continuous process. It is a further object of this invention that the nut cracking machine can reprocess nuts and effectively orient partially shelled nuts for maximum recovery of whole kernels. These and other objects are satisfied by the nut cracking machine described herein.

SUMMARY OF THE INVENTION

The nut cracking machine of this invention is designed to crack the shell of nuts having variations in size and shape. In addition, the machine can be operated in conjunction with other cracking and shelling machines for recracking nuts that are partially shelled or that have escaped cracking because of unusual size or shape. The invented machine is particularly useful in reprocessing macadamia nuts that have been incompletely shelled with maximized recovery of whole kernels from partially shelled nuts that retain the kernel in the remaining shell.

The invented nut cracking machine utilizes a carefully controlled squeezing of the nut to effect cracking of the shell without shattering the shell into small fragments. The machine is designed to orient the nut to an optimum position for minimum damage to the kernel when the shell is cracked. Additionally, the design permits shelled kernels that have inadvertently been fed to the cracking machine to pass without damage.

To accomplish these objectives, the cracking machine utilizes a pair of rotating disks that have opposed disk faces that are spaced apart to form a gap or cavity therebetween. The opposed faces of the disks have a peripheral portion that is tapered such that the gap widens as the perimeter of the disk is approached. A gap is maintained between non-tapered central portions of the disk faces to allow whole kernels to pass between the disks without damage.

The two disks are rotated together with one of the disks being rotated on a first axis and the other disk being rotated on a second axis slightly skewed to the first axis. In this manner the disk faces are not parallel, but are oblique such that the effective width of the space between the disks is not uniform, but includes relatively wider and narrower sectors for controlled compression of a nut placed between the faces of the rotating disks.

The oblique positioning of the disks and the tapered outer portions of the disk faces allow nuts of different size to be fed to the cracking machine without sorting. A feed mechanism feeds the nuts between the disks at the sector where the gap between the disks is widest. The taper to the disks allows the nuts to advance toward the central portion of the disks until the wedge-shaped gap has sufficiently narrowed such that the width of a nut matches the width of the gap. The nut is then engaged by the faces of the disks and is transported from the wide sector of the oblique disks to the narrow sector. During transport from the wide sector to the narrow sector the nut is compressed by the opposed faces of the disks cracking the shell. As the cracked nut continues to be transported around with the disks, the gap between disks widens and the shell and kernel are released and discharged from the disk cavity.

When the cracking machine is used to recrack partially shelled nuts, particularly macadamia nuts, a vibratory feeder is used to optimally orient the nut such that the disk faces engage each side of the shell of the partially cracked nut to maximize recovery of whole kernels and minimize crushing of the meat.

The nut cracking machine is designed not only crack nuts of different size, but by adjustment of the axial position of the disks to widen or narrow the space between disks, and, by adjustment of the skew at the axis of rotation of the oblique disk to vary the compression, the machine can crack nuts of different kinds that are substantially different in size and shell type.

BRIEF DESCRIPTION OF THE DRAWINGS

FIG. 4 is an enlarged side view of one of the roller units in FIG. 1.

FIG. 5 is an enlarged end view of the roller unit of FIG. 4.

DETAILED DESCRIPTION OF THE PREFERRED EMBODIMENT

Figure 1:
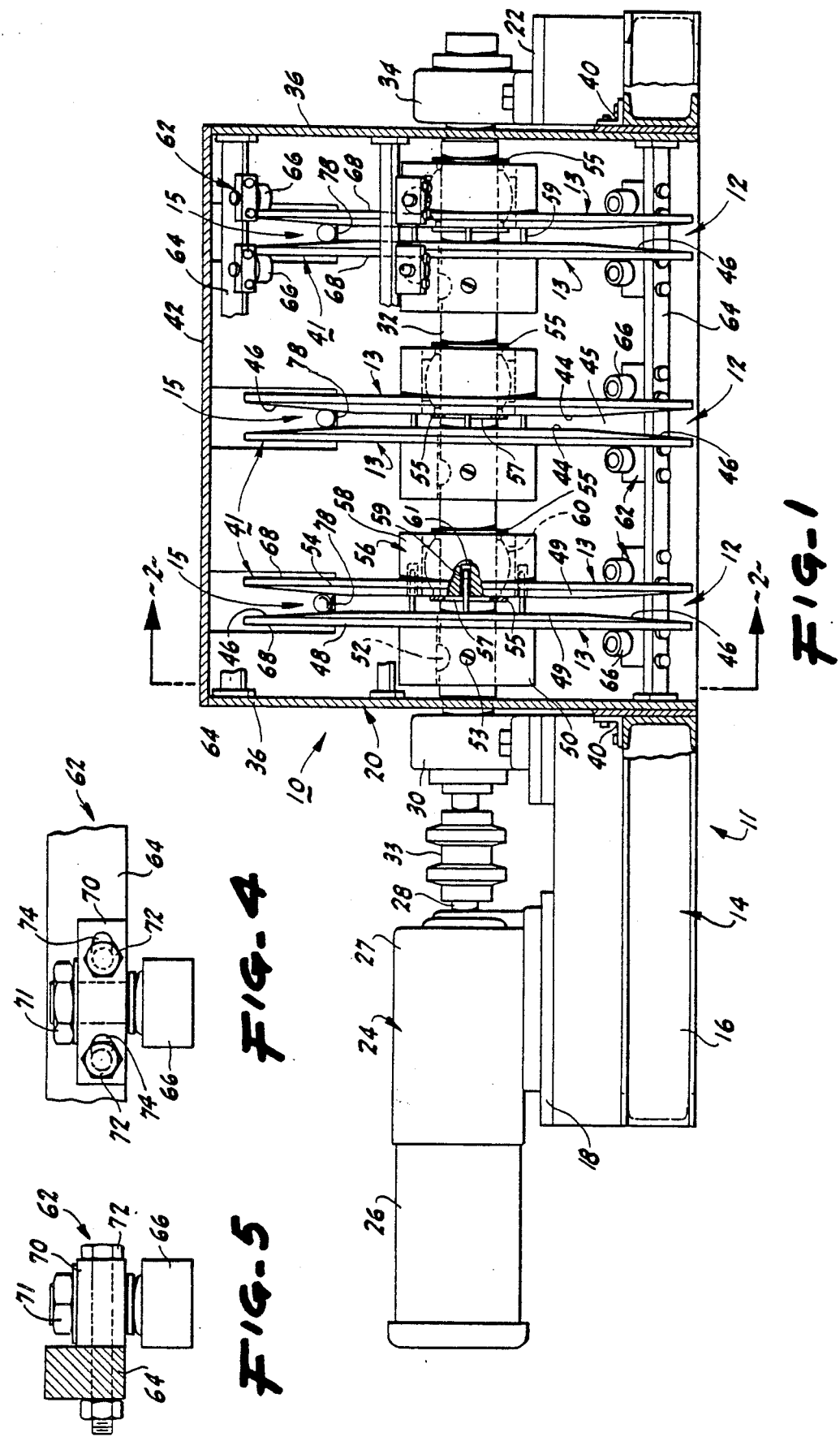
FIG. 1 is a side elevational view partially fragmented of the nut cracking machine.

Referring to FIG. 1, a nut cracking machine 10 is shown with three shelling stations 12. Each shelling station 12 includes opposed, tapered disks 13 between which the nuts are shelled. Nuts are fed from a hopper or other conventional supply (not shown) to a feed mechanism 15 at each station which delivers the nuts in file to the vertically oriented tapered disks 13 for shelling by the cracking machine 10.

The cracking machine 10 is constructed with a support assembly 11 having a support frame 14 formed of channel members 16 that support a motor platform 18, a shelling station housing 20 and a bearing platform 22. On the motor platform 18 is mounted a drive unit 24 that includes an electric drive motor 26 and reduction gear 27 that drive an output shaft 28 at approximately 45 r.p.m. Also mounted on the motor platform 18 is a pillow block 30 or end bearing for a disk shaft 32 on which are carried the disks 13 for the shelling stations. The shaft 32 is connected at one end to the drive shaft 28 of the drive unit 24 by a coupling 33 and at the other end is journaled in a pillow block 34 mounted on the bearing platform 22 at the far end of the support frame.

The shelling station housing 20 is arranged between the two pillow blocks 30 and 34 and includes opposed end plates 36 and side plates 38 (one removed) forming a box-like construction. The housing 20 is secured to the support frame by angle brackets 40. The shelling station has a cover 42 and an open bottom. The open bottom of the housing allows the meat and shells of the cracked nuts to fall to a collection tray or conveyer (not shown) for separation of the shells from the meat by known means.

The three shelling 12 stations as shown in FIGS. 1, each have a disk unit 41 comprising a pair of large circular disks 13 mounted side by side on the common horizontal shaft 32. Each disk 13 is essentially a flat cylinder with a center disk axis. The disk axis is the axis on which the disk uniformly rotates without wobble in the fashion of a wheel. The axis is perpendicular to the disk and is located at the disk center. Each disk in the unit 41 is mounted to the common shaft in a different manner such that the axis of rotation of one of the disks is skewed relative to the axis of rotation of the other disk. In this arrangement the opposed front faces 44 of the disks are not parallel, but slightly oblique such that the effective width of the cavity 45 between opposed disks widens at one sector and narrows at an opposite sector of the disk unit. Furthermore, the front face 44 of each disk in the unit 41 is not entirely flat, but includes a tapered outer portion 46, such that the cavity 45 between the outer portions 46 is annular and wedge-shaped with a wide peripheral opening. These two features combine to allow nuts of different size to be fed between the disks proximate the entry sector 43 of the disk unit 41 where the cavity is widest, with nuts of different size being engaged by the rotating disks at radially different locations in the tapered section according to size. The larger nuts engage the disks closer to the periphery while the smaller nuts engage the disks closer to a flat central portion of the disk. The engaged nuts rotate with the disks and receive a controlled compression between the plates which cracks the shells as the nuts approach the sector 88 of the disk unit where the plates are closest together.

Figure 2:
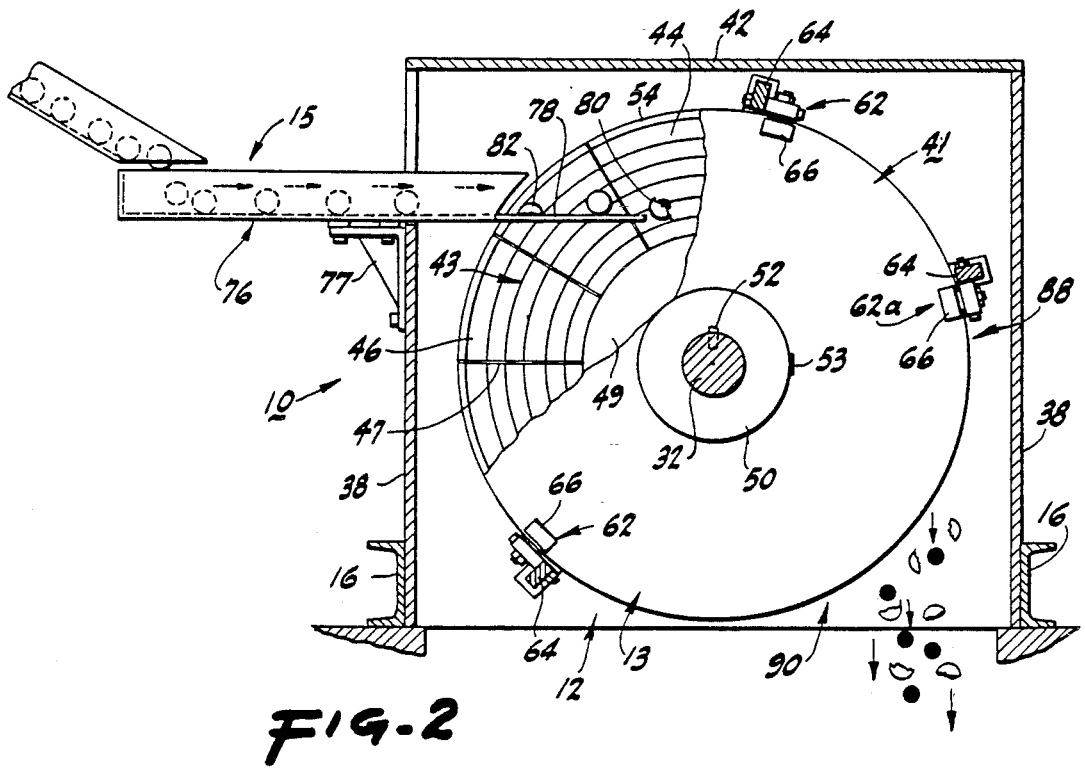
FIG. 2 is a cross sectional view, taken on the lines 2—2 in FIG. 1.
Figure 3:
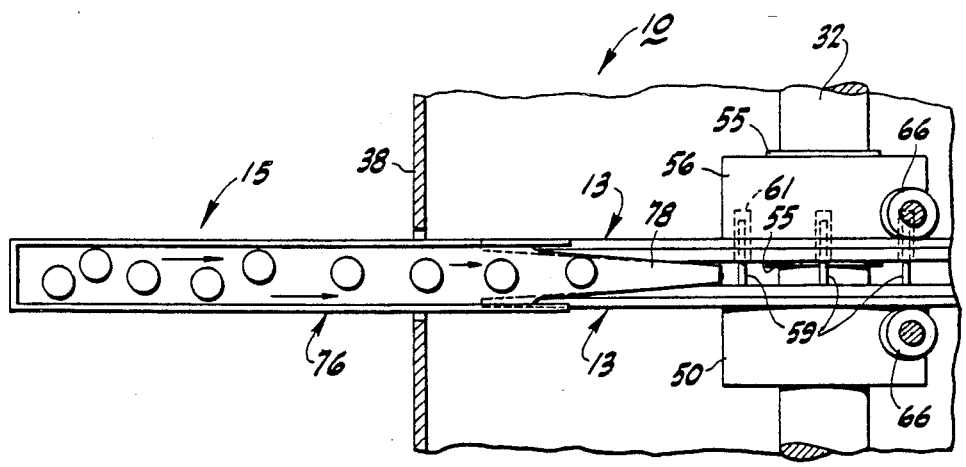
FIG. 3 is an enlarged top view partially fragmented, of a portion of one of the shelling stations in the cracking machine.

The angle of taper to the outer portion 46 of the disk is between three and four degrees. This taper allows an acceptable range of different sized nuts to be cracked in a single process without sorting. Excessive taper results in the nuts being ejected as the nuts are squeezed between the plates. The surface of the tapered outer portion 46 is roughened, preferably by concentric and radial grooves 47 as shown in FIG. 2. The grooves cooperate with the gradual nature of taper of the disk to prevent slippage, particularly of smooth shell nuts, when the nuts are compressed and cracked. The flat inner portions 49 of the disks are spaced apart such that kernels which are smaller then the smallest whole nuts fall between the disks without damage when they are inadvertently fed to the cracking machine.

Although mounting disks on separate shafts having different axes of rotation that are slightly skewed relative to one another will provide for the required oblique positioning of the front faces of the disks, it is difficult to incorporate multiple shelling stations in a single machine with a common drive means using this arrangement. In the preferred embodiment of this invention, one of the disks 48 in each disk unit 41 is fastened by shrink fitting to a hub 50 such that the disk 48 is oriented perpendicular or normal to the shaft axis. The central axis of the disk 48 in this mounting coincides with the axis of the shaft. The hub 50 is keyed to the shaft 32 by a key 52 (shown in dotted line in FIG. 1) and maintained in position by a set screw 53. The opposite disk 54 is fastened by shrink fitting to the outside of a spherical bearing 56, such as a Torrington Spherical Plain Bearing, which enables a limited degree of non-axial rotation of the bearing shell 58 relative to the journal core 60. The central axis of the disk 54 in this mounting does not coincide with the axis of the shaft during rotation of the disk according to this invention.

The spherical bearing 56 is positioned on the shaft 32 and retained by a pair of retainer clips 55, which engage grooves 57 in the shaft and prevent the bearing from axial displacement along the shaft 37. Adjustment of the gap between disks to accommodate different types of nuts is accomplished by loosing the set screw 53 on the hub 50 and moving the hub 50 and hub mounted disk 48.

The hub mounted disk 48 and bearing mounted disk 54 in the disk unit 41 are keyed together by four pins 59 fixed to the disk 48 which insert into four holes 61 in the disk 54. The diameter of the holes 61 is slightly larger than the diameter of the pins 59 to permit the oblique positioning and rotation of the bearing mounted disk 54. The pins 59 interconnect the disks 48 and 54 such that the disks rotate as a unit.

The disk 54 fixed to the spherical bearing 56 is oriented oblique to the disk 48 on the hub by a means that allows adjustment of its relative axis of rotation. The particular angle of orientation of one axis of rotation relative to the other is selected according to the nut to be cracked wherein the gap between the disks from the widest place to the narrowest place at the perimeter of the disk can be adjusted up to $\frac{1}{4}$" or more. Hard shell nuts such as the macadamia and walnut need only a differential of 1/16"-$\frac{1}{8}$" for cracking. A softer shell nut such as the almond requires a greater differential.

The disks in the preferred embodiment are 20" in diameter. Therefore, for a given displacement differential at the perimeter of the disk, a slightly smaller differential will result at a radially inward location on the disk. The tapered cracking portion of the disk occupies the outermost six inches of the disk such that the displacement change is minor and compensated by the smaller cracking displacement needed for the smaller nuts that position for cracking inward of the periphery. The taper on each disk is approximately ⅜" over the 6" outer portion allowing nuts with up to ¾" in diameter difference to be shelled in the same processing operation. It is to be understood that the use of terms such as "wide" and "narrow" in describing either the differential in cavity size around the disk unit resulting from the oblique positioning of the disks, or the differential in the gap of the cavity resulting from the tapered outer portions of the disks is relative, since the actual differentials are small in measurement.

To maintain the oblique disk 54 in the desired orientation as it rotates, three roller units 62 are mounted to support bars 64 and are spaced around the circumference of the disk 54. Only portions of the bars 64 are shown in FIG. 1. The bars are fixed to the opposed end walls 36. The roller units 62, shown in greater detail in FIGS. 4 and 5 have a guide roller 66 which engages the outer peripheral edge of the back face 68 of the disk. The guide roller 66 is a regular stud-type track roller which is mounted on a block 70 and secured by a nut 71. The block 70 is bolted to the support bar 64 by two bolts 72 which extend through elongated slots 74 in the block. The elongated slots 74 enable adjustment of the position of the roller and hence the particular orientation of the oblique disk. The orientation of the oblique disk controls the relative differential spacing between disks as the disks rotate.

The guide roller units 62 are mounted in opposed pairs with rollers 66 engaging the back face 68 of both the normal disk 48 and the oblique disk 54. In this manner the relative position of the disks is maintained and flexure of the disks from the resistance of the nuts to compression during cracking is minimized. The pairs of roller units 62 are not uniformly spaced around the circumference of the disks, but as shown in FIG. 2, two of the units 62 are more closely spaced and are positioned in the cracking sector 86 where the nuts are progressively squeezed and the stress on the disks is the greatest.

As shown in the cutaway section of FIG. 2, nuts are fed to a vibratory feeder 76 that has an elongated tongue 78 that extends between the outer tapered portions 46 of the front face 44 of the disks 13 in the disk unit 41. The vibratory feeder 76 is particularly useful for orienting partially shelled macadamia nuts or macadamia nut halves where the kernel or half kernel is retained in the shell. The heavier shell causes the nuts retaining a whole kernel to orient with the shell down as shown for the nut 80 in FIG. 2. A half nut shell retaining a half kernel orients with the split section down as shown for the nut 82 in FIG. 2. The vibratory feeder 76 is mounted on a bracket 77 and is oriented substantially horizontally such that nuts are step advanced, without rolling. In this manner the front faces of the opposed disks 13 optimally engage each side of the shell of the partially cracked nut when positioned in the manner of either of the partially shelled nuts 80 and 82 shown. Pressure from the disks squeeze the nut and crack the remaining shell releasing the kernel as the disks rotate.

Use of the vibratory feeder 76 minimizes kernel damage to partially shelled nuts.

Where the cracking machine is not used for recracking partially shelled nuts, but is used for cracking whole nuts, the vibratory feeder can be angled downward to accelerate the feed rate. Alternately, other feed mechanisms can be used to feed nuts between the disks where the orientation of the nuts is unimportant. The disk unit is divided into functionally defined sectors for purposes of description. The sectors can be shifted to accommodate different feed systems. For example, the entry sector, where the cavity gap is the widest is shown located at the side of the disk unit to accommodate the horizontal feed mechanism. The entry sector could also be located at the top of the disk unit, when employing a gravity feed mechanism that drops nuts from above. The position and adjustment of the roller units control both the circumferential location and the size of the non-uniform cavity gap.

The guide roller units 62 in FIG. 2 are adjusted such that the oblique positioning of the bearing mounted disk 54 widens the cavity 45 between the opposed disks at a side entry sector 43 where the horizontally positioned vibratory feeder 76 feeds nuts between the disks as shown for the preferred embodiment described.

The elongated tongue 78 of the feeder 76 is tapered to match the taper of the tapered outer portions 46 of the two disks. Nuts enter the wide peripheral gap between the disks at the entry sector 43 and advance as the wedge-shaped gap narrows until the size of nuts match the width of the gap and the nuts are engaged by the opposed disks. Nuts of different size are engaged at different radial positions on the feeder. Once engaged the nuts are lifted off the feeder by the two rotating disks and are compressed as the width of the cavity gradually diminishes when the disks rotate through the cracking sector 86 to the sector 88 proximate the roller unit 62a where the effective width of the cavity between the disks is at its narrowest. The disks then begin to part, discharging the meat and shells of the cracked nuts by centrifugal as well as gravitational force at the discharge sector 90.

As noted, the cracking machine 10 can be adjusted to accommodate different types of nuts by repositioning the disks on the shaft to widen or narrow the effective space between the disks. The cracking machine 10 can also be adjusted to increase the effective cracking pressure on the nuts by repositioning the roller units to alter the degree of skew of one disk relative to the other to change the effective displacement of the disks relative to one another over a cracking cycle. As desired, the location of the maximum and minimum gap between the opposed disks can be similarly changed by select adjusting of the roller units.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A nut cracking machine for cracking nuts of different size having an outer shell and an inner kernel comprising:
   a) a support assembly;
   b) a disk unit having a first disk and a second disk arranged beside and spaced from the first disk, the first disk having a center axis and a disk face with an outer portion and a periphery, and the second disk having a center axis and a disk face with an outer portion and a periphery with at least one of the disks having the outer portion tapered to the periphery, wherein the disk face of a second disk is arranged opposite the disk face of the first disk and forms a cavity between the disk faces with a gap between the outer portions of the disk faces that widens to the periphery;

c) support means on the support assembly for supporting the first disk for rotation about its center axis and supporting the second disk for rotation about its center axis with the axis of the second disk being skewed from the axis of the first disk, wherein the cavity formed between the disks widens at a wide sector of the disk unit and narrows at an opposite narrow sector;

d) rotation means for rotating the first disk and the second disk together about their respective center axis; and e) nut feed means for feeding nuts having shells into the gap between the disks from the periphery of the disks at the wide sector of the disk unit wherein nuts are engaged by the outer portions of the disk faces, transported to the narrow sector, and compressed, cracking the shells of the nuts during transport to the narrow sector, wherein the feed means comprises a vibratory feeder that feeds nuts in file to the gap between disks.

2. The nut cracking machine of claim 1 wherein both the first disk and the second disk have the outer portion of the disk face tapered to the periphery.

3. The nut cracking machine of claim 1 wherein the vibratory feeder has a tapered horizontal tongue that is inserted between the outer portions of the disks wherein the nuts step advance on the tongue toward the center axes of the disks wherein nuts of different size are engaged by the disk faces at different radial locations when the diameter of the nut matches the width of the gap and partially shelled nuts.

4. A nut cracking machine for cracking nuts of different size having an outer shell and an inner kernel comprising:

a) a support assembly;

b) a disk unit having a first disk and a second disk arranged beside and spaced from the first disk, the first disk having a center axis and a disk face with an outer portion and a periphery, and the second disk having a center axis and a disk face with an outer portion and a periphery with at least one of the disks having the outer portion tapered to the periphery, wherein the disk face of a second disk is arranged opposite the disk face of the first disk and forms a cavity between the disk faces with a gap between the outer portions of the disk faces that widens to the periphery;

c) support means on the support assembly for supporting the first disk for rotation about its center axis and supporting the second disk for rotation about its center axis with the axis of the second disk being skewed from the axis of the first disk, wherein the cavity formed between the disks widens at a wide sector of the disk unit and narrows at an opposite narrow sector;

d) rotation means for rotating the first disk and the second disk together about their respective center axis;

e) nut feed means for feeding nuts having shells into the gap between the disks from the periphery of the disks at the wide sector of the disk unit wherein nuts are engaged by the outer portions of the disk faces, transported to the narrow sector, and compressed, cracking the shells of the nuts during transport to the narrow sector; and f) adjustment means for adjusting the space between the first disk and the second disk wherein the adjustment means is adapted to reposition one of the disks axially on the disk shaft.

5. The nut cracking machine of claim 4 wherein each disk face has a flat central portion wherein a gap is formed between the central portions when the disks are spaced apart, the gap allowing passage of a kernel without damage.

6. The nut cracking machine of claim 4 wherein the outer portion of each disk has a roughened surface to grip the outer shell of the unit.

7. The nut cracking machine of claim 6 wherein the roughened surface includes concentric and radial grooves.

8. A nut cracking machine for cracking nuts of different size having a outer shell and an inner kernel comprising:

a) a support assembly;

b) a disk unit having a first disk and a second disk arranged beside and spaced from the first disk, the first disk have a center axis and a disk face with an outer portion and a periphery, and the second disk having a center axis and a disk face with an outer portion and a periphery with at least one of the disks having the outer portion tapered to the periphery, wherein the disk face of the second disk is arranged opposite the disk face of the first disk and forms a cavity between the disk faces with a gap between the outer portions of the disk faces that widens to the periphery;

c) support means on the support assembly for supporting the first disk for rotation about its center axis and supporting the second disk for rotation about its center axis with the axis of the second disk being skewed from the axis of the first disk, wherein the cavity formed between the disks widens at a wide sector of the disk unit and narrows at an opposite narrow sector, and wherein the support means comprises a horizontal disk shaft wherein the first disk is mounted to the shaft on a hub and the second disk is mounted to the shaft on a spherical bearing, the support means including guide means for guiding the second disk for rotation on an axis skewed to the axis of rotation of the first disk and shaft;

d) rotation means for rotating the first disk and the second disk together about their respective center axis; and e) nut feed means for feeding nuts having shells into the gap between the disks from the periphery of the disks at the wide sector of the disk unit, wherein nuts are engaged by the outer portions of the disk faces, transported to the narrow sector, and compressed, cracking the shells of the nuts during transport to the narrow sector.

9. The nut cracking machine of claim 8 wherein the guide means comprises a plurality of rollers contacting the disk near the periphery of the disks wherein the relative position of the disks is maintained.

10. The nut cracking machine of claim 9 wherein the means for rotating the first disk and the second disk together, comprises an electric drive unit connected to the disk shaft and means connecting the first disk to the second disk.

11. The nut cracking machine of claim 10 wherein the means connecting the first disk to the second disk comprises projecting pins on one disk inserted in oversized holes in the other disk.

12. The nut cracking machine of claim 8 comprising further a plurality of disk units each unit being mounted on the shaft and including a hub mounted disk and a bearing mounted disk.

13. A nut cracking machine for cracking nuts of different size having a outer shell and an inner kernel comprising:
 a) a support assembly;
 b) a disk unit having a first disk and a second disk arranged beside and spaced from the first disk,
  the first disk having a center axis and a disk face with an outer portion and a periphery, and
  the second disk having a center axis and a disk face with an outer portion and a periphery with at least one of the disks having the outer portion tapered to the periphery,
  wherein the disk face of the second disk is arranged opposite the disk face of the first disk and forms a cavity between the disk faces with a gap between the outer portions of the disk faces that widens to the periphery;
 c) support means on the support assembly for supporting the first disk for rotation about its center axis and supporting the second disk for rotation about its center axis with the axis of the second disk being skewed from the axis of the first disk, wherein the cavity formed between the disk widens at a wide sector of the disk unit and narrows at an opposite narrow sector;
 d) rotation means for rotating the first disk and the second disk together about their respective center axis;
 e) nut feed means for feeding nuts having shells into the gap between the disk from the periphery of the disks at the wide sector of the disk unit, wherein nuts are engaged by the outer portions of the disk faces, transported to the narrow sector, and compressed, cracking the shells of the nuts during transport to the narrow sector; and
 f) adjustment means for adjusting the degree of skew of the axis of the second disk relative to the axis of the first disk, wherein the adjustment means comprises a plurality of roller units having rollers contacting the disk with adjustable mounts on the rollers wherein the adjustment of the mounts repositions the rollers and reorients the disk contacted by the roller.

* * * * *